LINE TERMINATING CIRCUITS

INVENTORS
ROBERT A. GANGE &
PETER HSIEH
BY [signature]
ATTORNEY

LINE TERMINATING CIRCUITS

Filed June 12, 1968 2 Sheets-Sheet 2

INVENTORS
ROBERT A. GANGE &
PETER HSIEH
BY Samuel Cohen
ATTORNEY

United States Patent Office
3,541,475
Patented Nov. 17, 1970

3,541,475
LINE TERMINATING CIRCUITS

Robert A. Gange, Belle Mead, and Peter Hsieh, Cherry Hill, N.J., assignors to RCA Corporation, a corporation of Delaware Filed June 12, 1968, Ser. No. 736,341
Int. Cl. H03h 7/42
U.S. Cl. 333—25 6 Claims

ABSTRACT OF THE DISCLOSURE

A pair of lines, such as digit lines of a cryoelectric memory, are connected at one end to one terminal of a balanced driver and at the opposite end to the other terminal of the balanced driver. The connection, in each case, is through a balun and there is also mutual coupling between the baluns. The balun coils are wound in a sense to insure equal current flow through both lines and also to insure that exactly the same amount of current is drawn from each line as enters each line. Sense amplifiers are coupled to both ends of the pair of lines in such a way as to substantially reduce the effect of common-mode noise. The line termination is such that in-mode noise is also properly terminated.

BACKGROUND OF THE INVENTION

It is important in view of the relatively low amplitude sense signals which are generated during the read cycle of large cryoelectric memory systems and in view of the need for operating these memories at relatively high speeds (relatively short intervals between the write and read periods) that any noise which is generated during either the write or read cycle be suppressed. As part of this requirement, it is important that the lines from which the sense signals are obtained be properly terminated so that the relatively heavy currents present during the write period do not cause reflections to occur along these lines. Such reflections, once generated, do not quickly die out and if present during the following read period appear to the sense amplifiers as noise—sometimes of sufficient amplitude to completely swamp out the sense signal.

The object of the present invention is to provide an arrangement for terminating a transmission line, such as the sense line of a cryoelectric memory, in such a way that reflections and noise are minimized during the "read" operation.

SUMMARY OF THE INVENTION

A pair of transmission lines, a pair of baluns coupled to the respective ends of the transmission lines and mutually coupled to one another, and a balanced driver applying substantially equal currents through one balun to both lines and drawing the same amplitude of current through the other balun from the other end of both lines.

DETAILED DESCRIPTION

Figure 1:
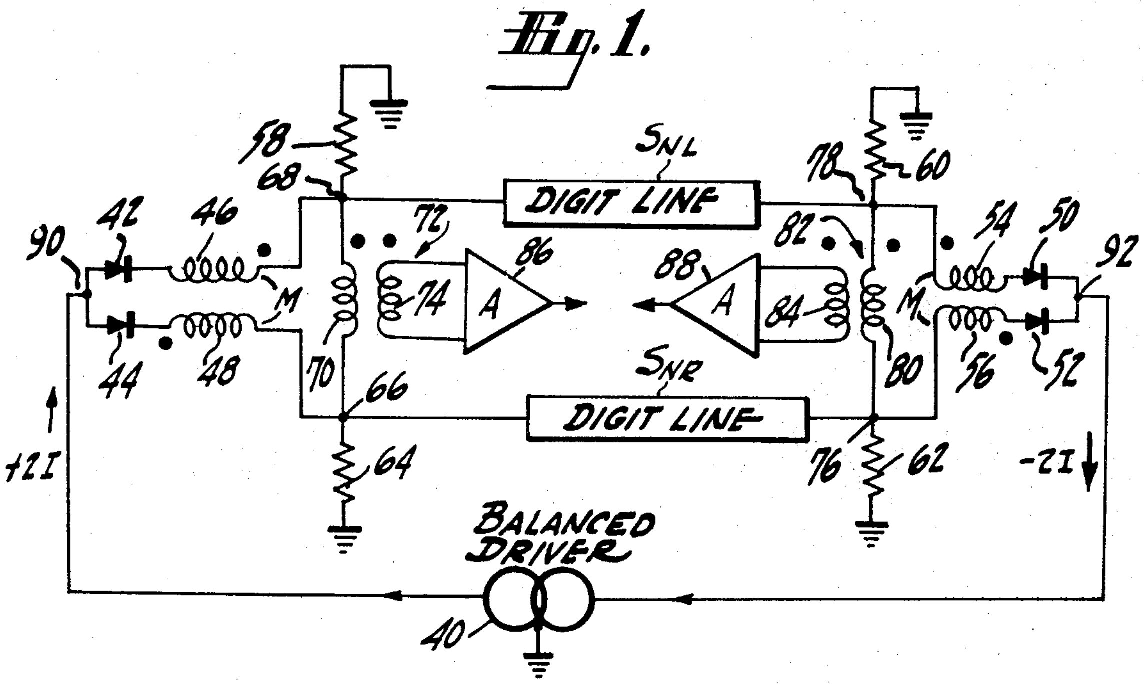
FIG. 1 is a schematic drawing of one form of the invention.
Figure 2:
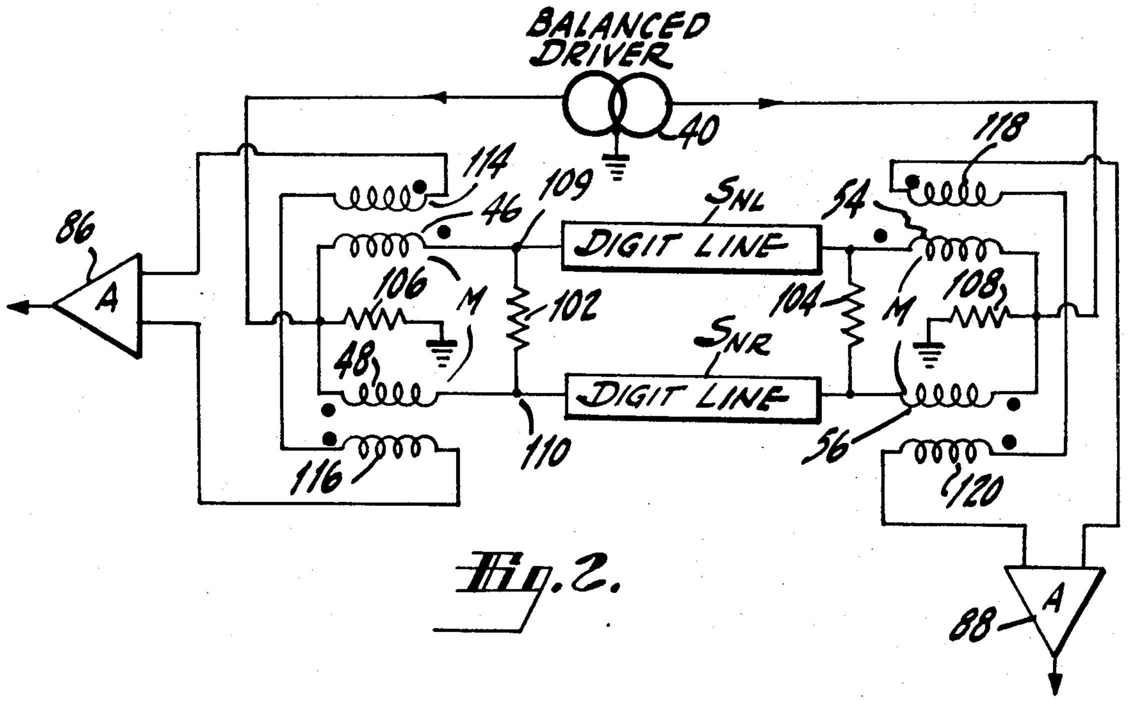
FIG. 2 is a schematic drawing of another form of the invention.
Figures 3, 4, 5, 6:
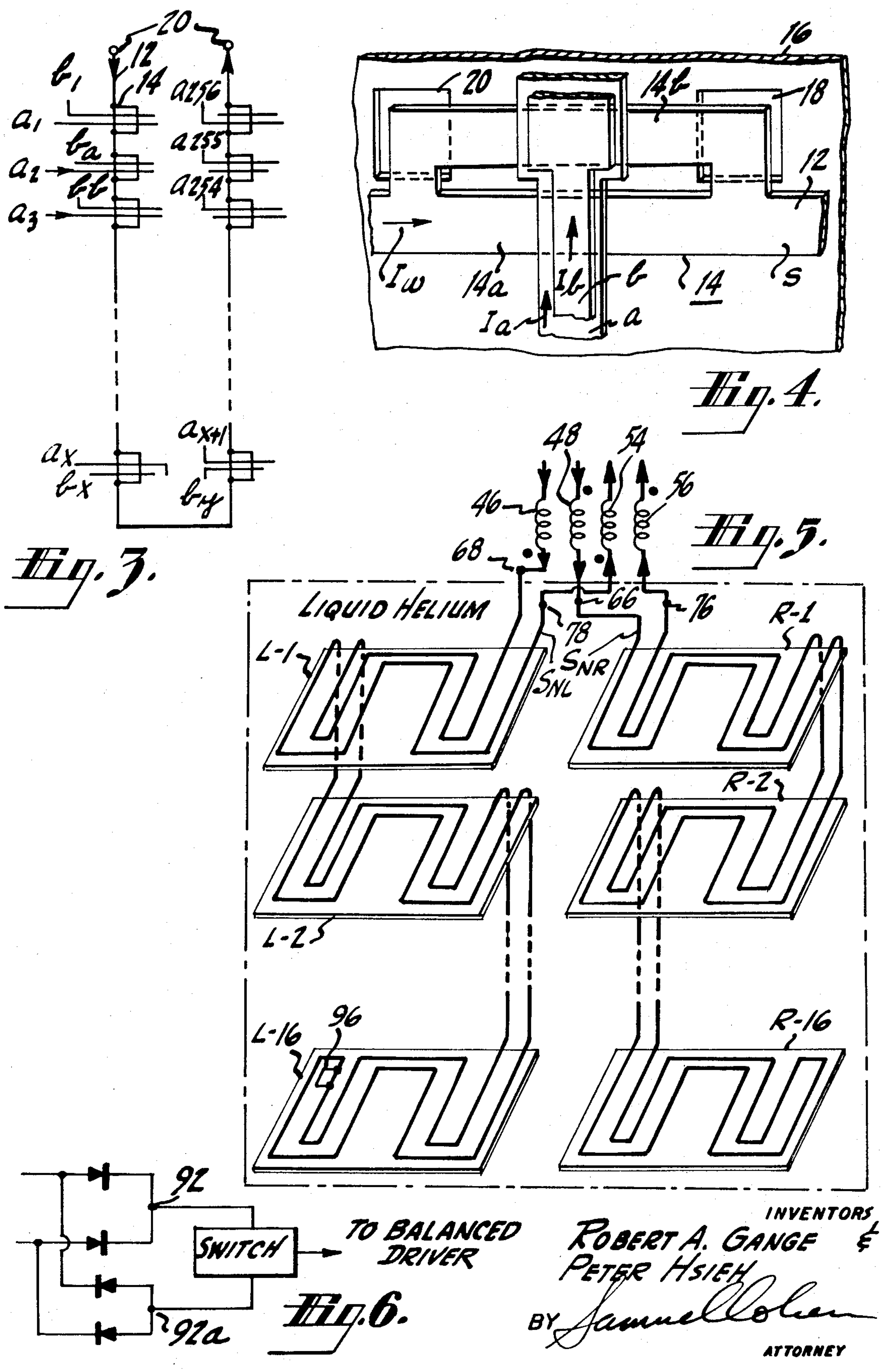
FIG. 3 is a schematic showing of the sense-digit line of a cryoelectric memory.
FIG. 4 is a perspective showing to enlarged scale of one memory location of a cryoelectric memory.
FIG. 5 is a perspective schematic showing of a plurality of memory planes and one of the sense-digit conductors for each group of planes.
FIG. 6 is a schematic drawing of a modification which may be incorporated in the circuit of FIG. 1.

Before discussing the circuits of the present invention shown in FIGS. 1 and 2, it is thought in order to describe briefly an environment in which these circuits are particularly useful and the problems which exist in this environment. FIG. 3 shows one type of transmission line for which the termination of FIGS. 1 and 2 is appropriate. The line is a superconductor line 12, which, for example, may be formed of tin and which, when operating, is in a liquid helium environment. The line is formed with a plurality of loops 14 along its length and each loop acts as a persistent current memory cell. During the write interval, the line 12 acts as a "digit line" and during the read interval as a "sense line."

A more realistic showing of a cell appears in FIG. 4. Each loop is insulated from and located over a ground plane 16. Two drive lines legended *a* and *b*, which are insulated from one another and from the loop 14 are located over the loop. These lines may be made of lead and the insulation (not shown) may be silicon-monoxide. There are holes 18 and 20 in the ground plane located under the corners of each loop. This and the longer length of path **14*b* insure that its inductance is much much greater than the inductance of path 14*a***.

Information representing one binary value may be written into the memory cell of FIG. 4 by applying a write current $I_w$ to the loop concurrently with the application of the *a* and *b* drive currents $I_a$ and $I_b$. In the absence of the drive currents, and in the presence of the write current $I_w$, the write current flows almost entirely in the path **14*a* of the loop since it is of relatively low inductance compared to path 14*b*. When the drive currents $I_a$ and $I_b$ are applied, path 14*a* is driven to its normal (resistive) state whereas path 14*b* remains superconducting. The write current $I_w$ therefore steers into path 14*b*. If now the drive currents $I_a$ and $I_b$ are removed while the write current $I_w$ is still present, path 14*a* returns to the superconducting state and the flux due to the current $I_w$, which is now surrounded by a superconducting loop, is trapped in the loop 14. Subsequently, when the current $I_w$ is removed, the trapped flux cannot escape and a persistent current remains circulating around the loop 14**. This persistent current represents storage of a binary digit of one value such as a 1.

If in the write procedure above, the write current $I_w$ is absent, then no persistent current is established in the loop 14 and the absence of this persistent current represents storage of the binary digit of other value such as binary 0. As an alternative, storage of a 0 may be represented by the storage of a persistent current which flows in a direction opposite to that representing storage of a 1. Such current may be stored by reversing the direction of the write current from that shown.

Information is read out of the loop 14 by applying the currents $I_a$ and $I_b$ in the absence of the write current $I_w$. The presence of these two currents drives the path **14*a* normal again and this causes the persistent current, if present, to develop a voltage across the loop. This voltage may be sensed at the terminals 20 at the ends of the line 12** as shown in FIG. 3.

A practical memory consisting of a large number of memory planes is shown in FIG. 5. While for purpose of illustration, the planes are shown spaced substantial distances from one another, in practice they are actually very close together. In this system, there may be a group of 64 digit-sense lines for one group of 16 memory planes, three of which planes, L–1, L–2 and L–16 are shown and other group of 64 digit-sense lines for a second group of memory planes, three of which planes are shown at R–1, R–2 and R–16. Each group of 64 digit lines, in this case, threads back and forth over each plane. Each line enters a plane closely adjacent to the place it leaves the plane. To simplify the drawing, only one of these 64 digit lines, namely line $S_{NL}$ is shown for the left group of planes and only one digit line $S_{NR}$ is shown for the right group of planes. The loops—there are a large number along each line on each plane, are not shown in FIG. 5.

In the operation of the large memory system shown in FIG. 5, 64 bits may be written in parallel into the memory and 64 bits may be read in parallel from the memory. These bits of a 64 bit "word" are stored in 64 loops, one loop per digit line and the 64 loops are located in one zone of one plane. Writing is accomplished by concurrently applying drive currents to *a* and *b* conductors which pass over the 64 loops of interest and write current of appropriate polarity to each of the 64 digit lines. As an alternative, during the application of the *a* and *b* currents, ones, for example, may be written by applying write currents in a given polarities to desired ones of the digit lines and zeros by not applying write current to other of the digit lines, or vice versa. The details of how this is done are not important for purposes of the present application.

In the operation as discussed above, the write current $I_W$, when present, and the drive currents $I_a$ and $I_b$ are of relatively high amplitude compared to the sense signal. In response to the write current $I_W$, a voltage may be directly generated on the digit-sense lines and in response to the drive currents, $I_a$ and $I_b$, voltages may be induced in the digit-sense lines. It is important that such voltages be dissipated before the read cycle starts to avoid the presence, during the read cycle, of both common mode and in-mode noise. Common mode noise is defined as that component of the noise present at the two inputs of an amplifier (in this case the memory sense amplifier) which appears as two signals of the same amplitude and polarity. In-mode noise is defined as that component of the noise present at the two inputs of an amplifier which appears as two signals of opposite polarity. Noise of similar polarity but different amplitude may be regarded as composed of "common-mode" and an "in-more" components.

In the system of FIG. 5, common-mode noise may also be generated in response to voltage changes of the ground planes due to charges which build up on the ground planes. The digit lines such as $S_{NL}$ and $S_{NR}$ are relatively long and are very close to the ground planes and there is therefore substantial capacitive coupling between the lines and the various planes. As a result, when write currents are applied to these lines, any unbalance between either the outgoing or the return portion of a line to ground, or any time differential between the positive and negative digit waveforms which propagate down either portion of the line, will cause the ground planes to "swing" in voltage.

The planes are located within a liquid helium bath and they are at some distance, such as one to several feet, from the system ground, which is outside of helium bath. It is found not possible to hold the ground planes at ground potential simply by connecting them to ground through a conductive path such as a wire. The reason is that at the frequencies involved, the wire itself acts alike an inductance of substantial value and a voltage builds up across this inductance as the charge accumulated on a ground plane attempts to discharge to ground through the wire. When operating the memory at high speed, this voltage may still be present during the read period and, if so, it appears to the sense amplifiers connected to the lines as noise which may be of much greater amplitude then the sense signals themselves, or which erroneously may be interpreted by the sense amplifier as a sense signal.

The termination circuit of the present invention, shown in FIG. 1, eliminates or at least substantially lessens the noise generated in the various ways described above. This circuit includes a balanced driver 40 of high internal impedance which is connected at one terminal through diodes 42 and 44 to the oppositely-wound coils 46 and 48, respectively, of a balun. The driver 40 is connected at its other terminal through diodes 50 and 52 to the oppositely-wound coils 54 and 56, respectively, of a second balun. Coil 54 is connected to digit line $S_{NL}$ and the coil 56 is connected to digit line $S_{NR}$. The opposite ends of the digit line $S_{NL}$ and $S_{NR}$ are connected respectively to coils 46 and 48.

The two digit lines are terminated at each end to ground in a resistor of a value equal to the characteristic impedance of the line measured to ground. These resistors are shown at 58, 60, 62 and 64 of FIG. 1. The terminals 66 and 68 at one end of lines $S_{NR}$ and $S_{NL}$, respectively, are connected to the input terminals of the primary winding 70 of a transformer 72. The secondary winding 74 of this transformer may be wound in the same direction as the primary winding. The terminals 76 and 78 at the opposite end of the lines $S_{NR}$ and $S_{NL}$, respectively, are connected to the primary winding 80 of transformer 82. Again, the secondary winding 84 of this transformer may be wound in the same direction as winding 80. The transformers 72 and 82 are connected to sense amplifiers 86 and 88, respectively.

The two baluns of FIG. 1 are wound on the same core and are mutually coupled. Coil 46 of the first balun is wound in the same direction as coil 54 of the second balun and coil 48 of the first balun is wound in the same direction as coil 56 of the second balun. This is shown somewhat more clearly in FIG. 5.

In the operation of the circuit of FIG. 1, the balanced driver applies a positive current pulse +2I through diodes 42, 44 to the balun 46, 48 and simultaneously applies a negative pulse −2I to through diodes 50 and 52 to the balun 54, 56. The digit lines are closely balanced and the baluns insure that equal currents flow through the two lines. This can be shown for balun 46, 48, for example, by calculating the voltage from the common point 90 through the balun 46, 48 through the respective lines to ground. In this calculation, it is assumed that the impedance of the paths which include one digit line is slightly different than the impedance of the paths which include the other digit line so that a slightly different amount of current flows through one line than the other.

Let $Z_L$=impedance of each coil $Z_S-\Delta Z$=impedance of the digit line $S_{NL}$ $Z_S+\Delta Z$=impedance of the other digit line $S_{NR}$ $Z_M$=impedance due to mutual coupling between two coils of the balun 2I=input current $I+\Delta I$=current flowing through the coil 46

$I-\Delta I$=current flowing through the coil 48

One half of the currents above flow through the respective lines $S_{NL}$ and $S_{NR}$ as $R_{58}=Z_S-\Delta Z$ and $$R_{64}=Z_S+\Delta Z$$

Since the voltage from point 90 through 42, 46 and $S_{NL}$ to ground is exactly the same as the voltage from point 90 through 44, 48 and $S_{NR}$ to ground, the following equality holds. (As the mutual impedance between baluns 46, 48 and baluns 54, 56 affects both paths equally, it is ignored.)

(1)

$$\left(\frac{I-\Delta I}{2}\right)(Z_s+\Delta Z)+Z_L(I-\Delta I)-Z_M(I+\Delta I) = \left(\frac{I+\Delta I}{2}\right)(Z_s-\Delta Z)+Z_L(I+\Delta I)-Z_M(I-\Delta I)$$

Upon simplification, equation 1 becomes:

(2)

$$\Delta I=I\left(\frac{\Delta Z}{Z_s+2(Z_L+Z_M)}\right)$$

From equation 2 it is clear that if the difference is impedance $2\Delta Z$ between the path which includes digit line $S_{NL}$ to ground and the path which includes digit line $S_{NR}$ to ground is small compared to the sum of the coil impedance $Z_L$ and the mutual impedance $Z_M$ between the two coils, then the difference in current $\Delta I$ flowing in the paths is very small. This design criterion is readily met and, in fact $Z_L$ can be made arbitrarily large compared to $\Delta Z$ so that, as a practical matter, $\Delta I$ reduces to 0.

It can be concluded that when, during a write interval, the balanced driver applies a current pulse to the lines, substantially equal currents flow through the two lines. During this interval, amplifiers 86 and 88 may be maintained in an off condition or may be designed for quick recovery. Assume that in-mode noise is generated during this write interval. This in-mode noise does cause a voltage drop across the primary windings 70 and 80. However, these voltage drops do not affect the amplifiers as the amplifiers either are off or are designed for quick recovery. But, these noise voltages must be properly terminated or they will cause reflections to occur. The terminating resistors do act as such a termination. They do this because the baluns represent a very high impedance to in-mode signals.

Common mode signals are also properly terminated by the resistors. Looking, for example, from point 78 to ground through paths other than that of resistor 60, the coil 54 acts as a relatively low impedance. The reason is that for common mode signals, the voltage drop induced across this coil 54 due to current flow through the coil is opposite to the voltage drop induced in coil 54 due to mutual coupling from coil 56. The result is substantially zero voltage develops across coil 54 and this, in turn, means that the coil appears to have a low impedance. (Note that the opposite effect occurs for in-mode signals.) The diode 50 is poled in the forward direction and therefore it also acts as a low impedance. However, the diode 52 is oppositely poled from diode 50 so that current cannot flow from terminal 92 through diode 52 and coil 56 and resistor 62 to ground. Similarly, the impedance from terminal 92 through the balanced driver 40 to ground is also high. Accordingly, resistor 60 properly terminates the digit line $S_{NL}$ in its characteristic resistance and line reflections are minimized. The situation is exactly the same for a signal of similar polarity looking from point 76 to ground through coil 56 and diode 52. The analysis of what occurs at the other end of the lines is the same as its structure is the same as that already discussed.

The write currents themselves which flow through the digit lines also must be properly terminated since these currents are common-mode signals, and the resistors provide such a termination for the same reasons as just discussed in connection with the common-mode noise voltages. The termination of both in-mode and common-mode signals means that no voltage appears across the primary windings 80, 74, and no noise signal is fed into the amplifiers 88, 86, respectively, during the read interval.

It has already been mentioned that winding 54 is poled in the same direction as winding 46. However, as should be clear from FIG. 5, current flows through winding 46 in one direction whereas it flows through winding 54 in the opposite direction. Thus, an analysis can be made similar to that above which will show that the current supplied through the winding 46 to the digit line $S_{NL}$ is precisely equal to the current extracted from the digit line $S_{NL}$ through the winding 54 by the balanced driver 40. As this is so and as the memory arrangement is as shown in FIG. 5 in that the input lead of a digit line to a group of memory planes is physically very close to the output lead of that same digit line from the group of memory planes, charge delivered to the ground plane by the positive-going wavefront is simultaneously extracted by the negative-going wavefront; therefore it is not possible for charge to accumulate on the respective planes.

Were the positive and negative waveforms to occur at different times, one or the other would supply charge to the distributed capacitance between the strip and the ground plane, and the ground plane would swing in voltage. The magnitude of this swing would be determined by the values of impedances which make up a voltage divider comprised of the distributed capacitance just discussed and the impedance (primarily inductive) between the ground plane and the system ground. However, the present invention insures substantial time coincidence between the positive and negative wavefronts, thereby preventing charge accumulation. Therefore, all of the memory planes remain at the same potential and essentially no noise is generated.

If the outgoing and return portions of a line are not in close proximity to one another, the difference in impedance between either strip to some common point on the ground plane will cause a difference in voltage and therefore charge to exist on the two distributed capacitances and this can cause a voltage swing to occur in the ground plane.

In the operation of the system of FIG. 5, while current is applied to two groups of digit lines simultaneously, one group leading to the left planes L and the other to the right planes R, only one zone on one plane, for example, one zone on plane L2, is selected by the *a* and *b* lines for writing. Current may flow through the corresponding group of loops on the opposite plane R2 in this example but these do not receive at the same time coincident *a* and *b* drive currents. The only purpose of driving both sets of 64 digit lines at the same time is for noise suppression.

During the read operation, digit current is not applied to the digit lines. However, coincident currents are applied to the *a* and *b* lines for 64 storage locations in a zone on one plane. It may be assumed that only one loop along line $S_{NL}$ is driven normal whereas no loop along the digit line $S_{NR}$ is driven normal. In this case, a voltage or the absence of a voltage, depending upon the state of the storage loop, develops across the digit line $S_{NL}$, that is, from terminal 68 to terminal 78. In the presence of a sense voltage, one of these terminals becomes relatively positive with respect to ground and the other relatively negative with respect to ground. At the same time terminals 66 and 76 are essentially at ground (see FIG. 1). Thus, voltage pulses are applied through transformers 72 and 82 to amplifiers 86 and 88. These amplifiers are strobed during the read interval and produce outputs.

The times at which the voltage pulse above arrives at the respective amplifiers 86 and 88 depend upon the location along the line $S_{NL}$ of the loop driven normal. For example, if it is close to the left end of the digit line of FIG. 1, the pulse will arrive at amplifier 86 well before it arrives at amplifier 88. In the worst case, the pulse will arrive at both amplifiers at the same time—after an interval proportional to one-half the digit line length. This worst case corresponds to a memory location at the center of the digit line. In FIG. 5, this would correspond to a location close to that shown at 96 (note that the loop is not drawn to scale—it is actually much smaller than shown). Thus, the use of two amplifiers arranged as shown permits a sense signal to be observed in the worst case after a time proportional to one-half the digit line length whereas in previous arrangements double this time is required in the worst case.

In a practical system, the two amplifiers 86 and 88 may be connected to an OR gate and the output of the OR gate employed as the sense signal. As an alternative, the two amplifiers may serve as pre-amplifiers and their outputs may be applied, in parallel, to a third amplifier.

The embodiment of the invention shown in FIG. 2 operates in the same general way as the FIG. 1 circuit. A feature of the circuit of FIG. 2 is that the diodes are not necessary. To show the similarity between the circuits, the same reference numerals are applied to similar parts.

In the operation of the circuit of FIG. 2, the balanced driver applies equal currents to both digit lines and simultaneously draws the same amount of current from each line as it applies to each line. The reasons are the same as those given for the circuit of FIG. 1.

The two lines of FIG. 2 are terminated by two different resistors. The first terminating resistor 102, 104, respectively, has a resistance equal to twice the characteristic impedance to ground of the digit line. The second terminating resistor 106, 108, respectively, has a value equal to one-half the characteristic impedance to ground of each line.

The resistors 106 and 108 provide appropriate terminations for common-mode noise currents and for drive currents. These currents flow in the same direction in both lines so that the windings 46, 48, 54 and 56 look like low values of impedance. Therefore, with respect to resistors 106 and 108, the two digit lines are in parallel and to properly terminate two such parallel lines in their characteristic impedance, a resistance equal to one-half the characteristic resistance of the line is appropriate. The resistors 102 and 104 represent an "open circuit" to the common mode waves and therefore do not adversely affect these terminations. For such voltages, the voltage present, for example, at terminal 109 is equal to the voltage present at terminal 110 and therefore no current flows through resistor 102. The same holds for resistor 104.

With respect to in-mode noise, the baluns appear to have a relatively high value of impedance. Now, for example, the voltage developed across a coil such as 46 due to current flow through the coil is of the same polarity as the voltage induced across coil 46 by current flow in the opposite direction through coil 48. Resistors 102 and 104, however, appear to be in series with the two digit lines when they are carrying currents in opposite directions. Since these resistors each have an impedance equal to twice the characteristic line impedance they operate to terminate each line at each end in its characteristic impedance for in-mode noise and dissipate such noise without permitting reflections to occur.

The sense voltages may be obtained from the circuit of FIG. 2 by windings such as 114 and 116 which are coupled to the balun wires. These windings, which act as secondary transformer windings, are interconnected as shown in FIG. 2 so that any write noise voltages which may develop across resistor 102 cancel one another. The interconnection is also such that the sense voltage applied to the sense amplifier 86 is the sum of the voltages across windings 114 and 116 and therefore relatively high. Windings 118 and 120 are coupled, respectively, to the balun windings 54 and 56 in a similar manner.

In describing the operation of the memory system of FIGS. 3–5, it is mentioned that two different modes of operation are possible. In one, the binary digits 1 and 0 are represented by persistent currents which flow in opposite directions, respectively. In the other, one binary digit is represented by the absence of persistent current and the other by the flow of persistent current in a given direction. The circuit of FIG. 2 is suitable for both modes of operation. The circuit of FIG. 1, as shown, is suitable only for the second mode of operation.

With minor modification, the circuit of FIG. 1 can also be operated in the first mode discussed above. The modification is the addition of four diodes. One pair of diodes is connected, for example, at their anodes to the cathodes of diode 52 and at their cathodes to a common point 92*a* which is separate from point 92. In addition, a switch such as a bi-directional transistor switch, is employed to connect one lead of the balanced driver either to point 92 or to point 92*a*, depending upon the direction of current flow. This modification is shown in FIG. 6. The other pair of diodes and the switch are similarly connected to the other end of the arrangement. The anodes of the added diodes are connected to the cathodes of diodes 42 and 44, respectively, and the anodes to a common point 90*a*. A second bi-directional switch connects either point 90 or 90*a* to the balanced driver. This modification is not separately illustrated as the principle is already shown in FIG. 6.

What is claimed is:

1. In combination:
- a pair of transmission lines;
- a balanced driver for producing at one output terminal a pulse of one polarity and at a second output terminal a pulse of opposite polarity;
- a pair of mutually coupled, oppositely wound coils of substantially the same inductance connecting one terminal of said driver to one end of said pair of transmission lines;
- a second pair of mutually coupled, oppositely wound coils of substantially the same inductance connecting the other terminal of said driver to the other end of said pair of transmission lines; and
- means terminating each line at each end in its characteristic impedance.

2. The combination set forth in claim 1, wherein said first pair of coils is mutually coupled to the second pair of coils and wherein the coils connected to the same line are wound in the same direction and exhibit substantially the same inductance.

3. The combination set forth in claim 1, further including four diodes, each in series with a different coil, said diodes being poled in the forward direction relative to the pulses produced by said balanced driver.

4. The combination set forth in claim 1, further including two sense amplifiers, one coupled between the two lines at one end thereof and the other coupled between the two lines at the other end thereof.

5. The combination set forth in claim 1, wherein said terminating means includes two resistors, one connected between the two lines at one end thereof and the other connected between the two lines at the other end thereof, each resistor having a value equal to twice the characteristic resistance of a line; and further including third and fourth resistors, one connected between a point of reference potential and a point in the circuit between the driver and one pair of coils and the other between a point of reference potential and a point in the circuit between the driver and the second pair of coils, said third and fourth resistors each having a value equal to one-half the characteristic resistance of a line.

6. In combination:
- a pair of transmission lines;
- a pair of baluns coupled to the respective ends of the transmission lines and mutually coupled to one another; and
- a balanced driver applying equal currents through one balun to both lines and drawing the same amplitude of current through the other balun from the other end of both lines.

References Cited

UNITED STATES PATENTS 3,025,480 3/1962 Guanella ---------- 333—26 X

OTHER REFERENCES

"Some Broad Band Transformers," Ruthroff in Proceedings of the IRE, August 1959, pp. 1337–1342.

HERMAN KARL SAALBACH, Primary Examiner

M. NUSSBAUM, Assistant Examiner

U.S. Cl. X.R.

330—149; 340—173.1